United States Patent
Duan et al.

(10) Patent No.: US 11,360,906 B2
(45) Date of Patent: Jun. 14, 2022

(54) INTER-DEVICE PROCESSING SYSTEM WITH CACHE COHERENCY

(71) Applicant: Alibaba Group Holding Limited, Grand Cayman (KY)

(72) Inventors: Lide Duan, Sunnyvale, CA (US); Hongyu Liu, Sunnyvale, CA (US); Hongzhong Zheng, Sunnyvale, CA (US); Yen-Kuang Chen, Palo Alto, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 133 days.

(21) Appl. No.: 16/994,291

(22) Filed: Aug. 14, 2020

(65) Prior Publication Data

US 2022/0050786 A1   Feb. 17, 2022

(51) Int. Cl.
| | |
|---|---|
| *G06F 12/0891* | (2016.01) |
| *G06F 12/0817* | (2016.01) |
| *G06F 13/42* | (2006.01) |
| *G06F 13/40* | (2006.01) |
| *G06F 9/54* | (2006.01) |

(52) U.S. Cl.
CPC .......... *G06F 12/0891* (2013.01); *G06F 9/546* (2013.01); *G06F 12/0828* (2013.01); *G06F 13/409* (2013.01); *G06F 13/4068* (2013.01); *G06F 13/4221* (2013.01); *G06F 2212/7209* (2013.01); *G06F 2213/0026* (2013.01)

(58) Field of Classification Search
CPC .. G06F 12/0891; G06F 9/546; G06F 12/0828; G06F 13/4068; G06F 13/409; G06F 13/4221; G06F 2212/7209; G06F 2213/0026; G06F 12/0817; G06F 12/0895
See application file for complete search history.

(56) References Cited

U.S. PATENT DOCUMENTS

| | | | |
|---|---|---|---|
| 2004/0236912 A1* | 11/2004 | Glasco | G06F 12/0817 711/E12.027 |
| 2005/0177688 A1 | 8/2005 | Gaither et al. | |
| 2007/0022254 A1* | 1/2007 | Veazey | G06F 12/0817 711/E12.027 |
| 2007/0150663 A1 | 6/2007 | Mendelson et al. | |
| 2009/0063780 A1 | 3/2009 | Terechko et al. | |
| 2009/0083493 A1 | 3/2009 | Kinter | |
| 2010/0274971 A1 | 10/2010 | Solihin | |
| 2011/0082904 A1 | 4/2011 | Ebbes et al. | |
| 2011/0119450 A1 | 5/2011 | Choi et al. | |
| 2011/0179229 A1 | 7/2011 | Chen et al. | |
| 2011/0320738 A1 | 12/2011 | Blake et al. | |
| 2012/0124297 A1 | 5/2012 | Chung et al. | |
| 2013/0031314 A1 | 1/2013 | Kinter | |
| 2013/0073811 A1* | 3/2013 | Beckmann | G06F 12/0817 711/141 |
| 2013/0097385 A1 | 4/2013 | Beckmann et al. | |
| 2014/0281190 A1 | 9/2014 | Kaushikkar | |
| 2014/0310469 A1 | 10/2014 | Machnicki et al. | |

(Continued)

*Primary Examiner* — Idriss N Alrobaye
*Assistant Examiner* — Richard B Franklin (57) ABSTRACT

The devices within an inter-device processing system maintain data coherency in the last level caches of the system as a cache line of data is shared between the devices by utilizing a directory in one of the devices that tracks the coherency protocol states of the memory addresses in the last level caches of the system.

20 Claims, 8 Drawing Sheets

(56) References Cited

U.S. PATENT DOCUMENTS

| | | |
|---|---|---|
| 2015/0067246 A1 | 3/2015 | Kanchana et al. |
| 2015/0106571 A1 | 4/2015 | Bernard et al. |
| 2015/0220437 A1 | 8/2015 | Solihin |
| 2015/0286577 A1 | 10/2015 | Solihin |
| 2015/0324290 A1 | 11/2015 | Leidel et al. |
| 2016/0328324 A1 | 11/2016 | Daly et al. |
| 2017/0024320 A1 | 1/2017 | Forrest et al. |
| 2017/0344479 A1 | 11/2017 | Boyer et al. |
| 2017/0351612 A1 | 12/2017 | Yao et al. |
| 2018/0143905 A1 | 5/2018 | Roberts et al. |
| 2018/0157589 A1 | 6/2018 | Jayasena et al. |
| 2019/0050333 A1 | 2/2019 | Chacon et al. |
| 2019/0087305 A1 | 3/2019 | Mola |
| 2019/0220403 A1 | 7/2019 | Mola |
| 2019/0258556 A1 | 8/2019 | Mola |

\* cited by examiner

INTER-DEVICE PROCESSING SYSTEM WITH CACHE COHERENCY

BACKGROUND OF THE INVENTION

1. Field of the Invention

The present invention relates to an inter-device processing system and, more particularly, to an inter-device processing system with cache coherency.

2. Description of the Related Art

An inter-device processing system is a system that includes a host processor and a number of specialized devices, such as a graphical processor unit (GPU), a field programmable gate array (FPGA), and a solid-state device (SSD), that are coupled together by way of an external bus, such as a peripheral component interconnect express (PCIe) bus.

In addition, the host processor and the specialized devices each has a memory, which together form the total memory space of the system. For example, a memory space that extends from A to E could include a memory range of A to B with the host processor, a memory range B to C with a GPU, a memory range C to D with a FPGA, and a memory range of D to E with a SSD. Many of the specialized devices include a level-1 (L1) cache, a level-2 (L2) cache, and a main memory.

Further, the host processor and the specialized devices share and modify data between each other. For example, the host processor could access and use or modify data stored in the memory space of the GPU, the FPGA, and the SSD, while the GPU could access and use or modify data stored in the memory space of host processor, the FPGA, and the SSD.

When sharing data between a number of devices, it is important to maintain data coherency, i.e., ensure that different copies of the data are the same. The PCIe protocol includes semantics (operands-command names) for transferring data from, for example, the GPU to the host processor, or the host processor to the GPU.

To maintain coherency with the PCIe protocol, a programmer must keep track of where valid and invalid data are stored as the code is written to ensure that any copies of the data are the same. Thus, one disadvantage of a PCIe approach is that writing code, such as a multi-threaded program, is labor intensive in part because of the time required to monitor the location of valid data.

Further, when transferring data from the L2 cache of one device to the L2 cache of another device, the minimum amount of data that can be transferred is a page of data, which is commonly equal to 64 cache lines (4 KB). Thus, another disadvantage is excess bus traffic where 64 cache lines (a page) must be transferred when only a few cache lines need to be transferred.

A compute express link (CXL) is a PCIe-based approach to inter-communicating between a host processor and a number of specialized devices that have shareable L2 cache memories. However, developing an approach to maintaining L2 cache coherency among the various devices is up to the programmer.

Thus, there is a need for an approach to maintaining cache coherence between the L2 caches of the host processor and the specialized devices.

SUMMARY OF THE INVENTION

The present invention simplifies programming and reduces the bus traffic required to transfer a cache line between devices in an inter-device processing system. The processing system of the present invention includes a first device that has a first cache. The first device to output a first request to read requested data associated with a memory address when the first cache of the first device does not have a valid version of the requested data. The processing system also includes a second device that is coupled to the first device. The second device has a coherence directory. The second device to check the coherence directory in response to the first request and, when the coherence directory indicates that no device has a cache line with a valid copy of the requested data, output a first fetch command to fetch data. The first request being output by the first device to only the second device. The processing system further includes a third device that is coupled to the first and second devices. The third device has a third cache and a non-cache memory. The third device to output the requested data to only the second device from the non-cache memory in response to the first fetch command. The second device to forward the requested data to the first device, and update a coherence status of the memory address in the coherence directory from invalid to shared to indicate that the first device shares a copy of the requested data.

The present invention also includes a method for operating an inter-device processing system. The method includes receiving a first request to read requested data associated with a memory address when a cache of a local device does not have a valid version of the requested data. The method also includes checking a coherence directory with a host device in response to the first request and, when the coherence directory indicates that no device has a cache line with a valid copy of the requested data: determining a home device associated with the memory address from the coherence directory, and outputting a fetch command to the home device to fetch the requested data from a non-cache memory. The first request is addressed to only the second device. The fetch command is addressed to only the home device. The method further includes receiving the requested data from the home device, updating a coherence status of the memory address from invalid to shared in the coherence directory, and forwarding the requested data to the local device.

The present invention further includes a non-transitory computer-readable storage medium that has embedded therein program instructions, which when executed by one or more processors of a device, causes the device to execute a method that operates an inter-device processing system. The method includes receiving a first request to read requested data associated with a memory address when a cache of a local device does not have a valid version of the requested data. The method also includes checking a coherence directory with a host device in response to the first request and, when the coherence directory indicates that no device has a cache line with a valid copy of the requested data: determining a home device associated with the memory address from the coherence directory, and outputting a fetch command to the home device to fetch the requested data from a non-cache memory. The first request is addressed to only the second device. The fetch command is addressed to only the home device. The method further includes receiving the requested data from the home device, updating a coherence status of the memory address from invalid to shared in the coherence directory, and forwarding the requested data to the local device.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings described herein are used for providing further understanding of the present application and constitute a part of the present application. Exemplary embodiments of the present application and the description thereof are used for explaining the present application and do not constitute limitations on the present application.

DETAILED DESCRIPTION OF THE INVENTION

Figure 1:
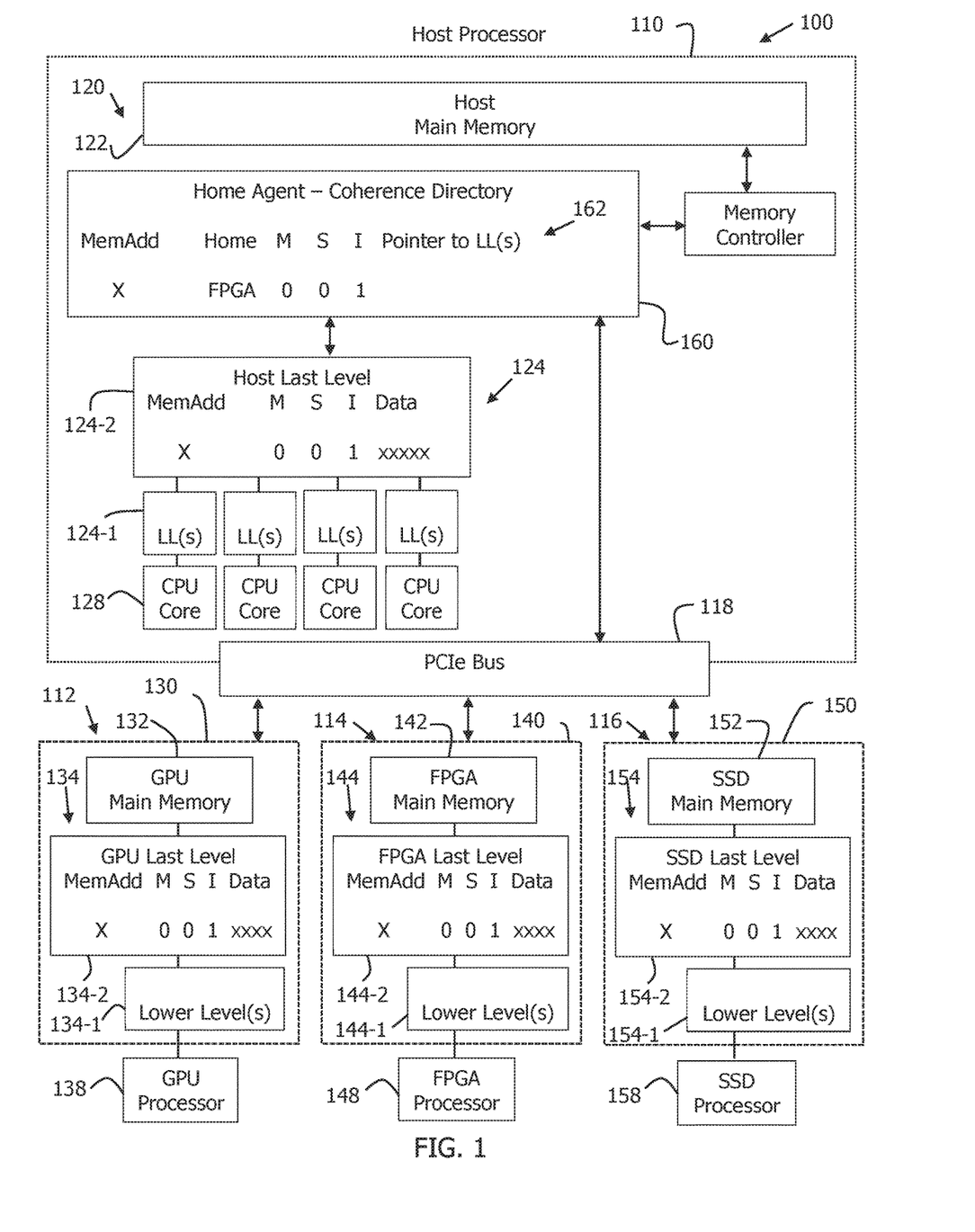
FIG. 1 is a block diagram that illustrates an example of an inter-device processing system 100 in accordance with the present invention.

FIG. 1 shows a block diagram that illustrates an example of an inter-device processing system 100 in accordance with the present invention. As shown in FIG. 1, processing system 100 includes a host processor 110, a first specialized device 112, such as a graphical processor unit (GPU), a second specialized device 114, such as a field programmable gate array (FPGA), and a third specialized device 116, such as a solid-state device (SSD).

In addition, processing system 100 also includes an external bus 118, such as a peripheral component interconnect express (PCIe) bus, that couples together host processor 110, first specialized device 112, second specialized device 114, and third specialized device 116. Bus 118 can be implemented using any suitable electrical, optical, or wireless technology.

Host processor 110 has a memory 120 that includes a main memory 122 and a cache memory 124. Cache memory 124, in turn, includes a number of levels, including one or more lower levels (LL) 124-1 and a last level 124-2. Similarly, the first, second, and third specialized devices 112, 114, and 116 have memories 130, 140, and 150 respectively.

Memory 130 includes a main memory 132 and a cache memory 134. Cache memory 134 includes a number of levels, including one or more lower levels 134-1 and a last level 134-2. Memory 140 includes a main memory 142 and a cache memory 144. Cache memory 144 includes a number of levels, including one or more lower levels 144-1 and a last level 144-2. Memory 150 includes a main memory 152 and a cache memory 154. Cache memory 154 includes a number of levels, including one or more lower levels 154-1 and a last level 154-2.

In a memory having two cache levels, the lower level has a L1 cache, while the last level has a L2 cache coupled to the L1 cache and the main memory in a conventional manner. In a memory having three cache levels, the lower levels have a L1 cache and a L2 cache coupled together in a conventional manner, while the last level has a L3 cache coupled to the L2 cache and the main memory in a conventional manner.

In a memory having four cache levels, the lower levels have a L1 cache, a L2 cache, and a L3 cache coupled together in a conventional manner, while the last level has a L4 cache coupled to the L3 cache and the main memory in a conventional manner. As an example, L1 caches commonly store 50 KB of data, while L2 caches common store 500 KB of data and main memories commonly store 10 GB of data. Other cache and main memory sizes can also be used.

As further shown in FIG. 1, each of the last level caches 124-2, 134-2, 144-2, 154-2 has a number of cache lines, where each cache line includes a memory address, a modified-shared-invalid (MSI) cache coherence indicator, and data. Each cache line can include additional items as needed. In the MSI protocol, each cache line is marked with one of three different coherence states, "M" for modified, "S" for shared, and "I" for invalid.

When a cache line is marked with a "M," the data in the cache line has been modified and the cache line has the only valid copy. When a cache line is marked with a "S," the data in the cache line is one of a number of unmodified copies. In addition, the data in the cache line cannot be modified while in the S state. When a cache line is marked with an "I," the data in the cache line is invalid. Various extensions of the MSI protocol, such as MESI and MOSI along with others, can alternately be used.

As also shown in FIG. 1, host processor 110 additionally includes a number of CPU cores 128 that are coupled to corresponding lower level caches 124-1. Four cores are shown for purposes of illustration only. Other numbers of cores can alternately be used. Similarly, the first, second, and third specialized devices 112, 114, and 116 have processors 138, 148, and 158 that are coupled to the lower level caches 134-1, 144-1, and 154-1, respectively.

As additionally shown in FIG. 1, host processor 110 also includes a home agent 160 that has specialized processing and a memory that maintains a coherence directory 162. The directory 162 includes a list of memory addresses and, for each memory address, a memory-address-home indicator, a MSI cache coherence indicator, and a pointer. Each memory address in coherence directory 162 can include additional items as needed, but does not store the associated requested data.

The memory space is divided up such that, for example, a first address range is stored in host main memory 122, a second address range is stored in main memory 132 of specialized device 112, a third address range is stored in main memory 142 of specialized device 114, and a fourth address range is stored in main memory 152 of specialized device 116.

The memory-address-home indicator, in turn, identifies the main memory that includes the memory address. For example, the memory address home for a memory address that lies in the address range of specialized device 114 is specialized device 114. Optionally, to save memory space, the memory-address-home indicator can be omitted, and home agent 160 can calculate the memory address home from a given memory address. In addition, when a cache line of a last level cache stores a valid copy of data, the pointer in coherence directory 162 identifies the cache that has a valid copy.

In operation, host processor 110 and the specialized devices 112, 114, and 116 share and modify data between each other while maintaining cache coherency. When a processor (core 128, processor 138, processor 148, or processor 158) outputs a request to read requested data associated with a memory address "X," the request first goes to the associated lower level cache(s) (124-1, 134-1, 144-1, or 154-1, respectively), which provides the data when present and valid. When not present or invalid in the lower level cache(s), the request goes to the associated last level cache (124-2, 134-2, 144-2, or 154-2, respectively), which provides the data when present and valid.

When the MSI state in the associated last level cache is marked with an "I" to indicate that the data associated with memory address X is invalid or not present, the device of the processor requesting the read request forwards the request to only (no broadcast) home agent 160. Home agent 160 checks coherence directory 162 in response to the read request and, when the MSI state of the memory address in coherence directory 162 of home agent 160 is marked with an "I" to indicate that none of the last level caches has a cache line of memory address X that holds a valid copy of the data, home agent 160 determines the home of the main memory associated with memory address X by reading the memory-address-home indicator, or by calculating the home of the main memory from the memory address X.

Following this, home agent 160 outputs a fetch command to only (no broadcast) the home of the main memory, which outputs the requested data associated with memory address X back to only (no broadcast) home agent 160. Home agent 160 then forwards the data to the last level cache of the processor that requested the data.

For example, when processor 138 outputs a request to read the data associated with a memory address "X," the request first goes to lower level cache 134-1, which provides the data when present and valid. When not present or invalid in lower level cache 134-1, the request goes to last level cache 134-2, which provides the data when present and valid.

As shown in FIG. 1, when the MSI state in last level cache 134-2 is marked with an "I" to indicate that the data associated with memory address X is invalid, memory 130 forwards the request to only home agent 160 by way of bus 118. Home agent 160 checks coherence directory 162 and, when the MSI state of the memory address in home agent 160 is marked with an "I" to indicate that none of the last level caches have a cache line that holds a valid copy of the data at memory address X, home agent 160 determines that the home of memory address X is located in the memory range associated with, for example, main memory 142 of second specialized device 114.

Following this, home agent 160 outputs a fetch command to only main memory 142 of second specialized device 114, which outputs the data associated with memory address X back to home agent 160. Home agent 160 then forwards the data to first specialized device 112 to be provided to processor 138.

Figure 2:
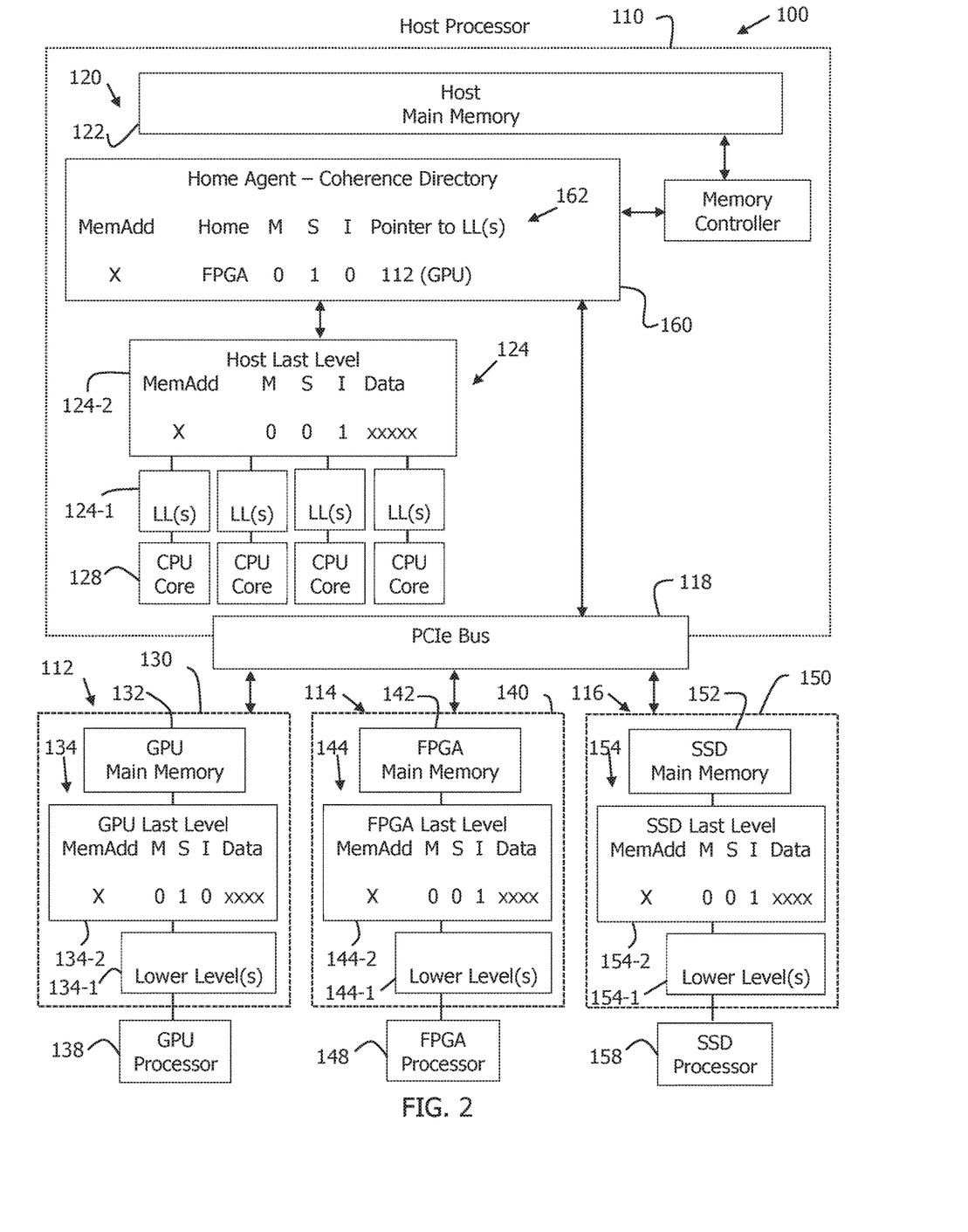
FIG. 2 is a flow chart illustrating an example of the coherence updates to processing system 100 in accordance with the present invention.

FIG. 2 shows a block diagram that illustrates an example of the coherence updates to processing system 100 in accordance with the present invention. In the FIG. 2 example, first specialized device 112 output the read request, and the home of the main memory is main memory 142 of second specialized device 114.

As shown in FIG. 2, home agent 160 updates both the MSI state of memory address X in coherence directory 162 from I for invalid to S for shared, and the last level (LL) pointer field to point to specialized device 112. In addition, first specialized device 112 updates the MSI state of memory address X from I for invalid to S for shared in last level cache 134-2.

Figure 3:
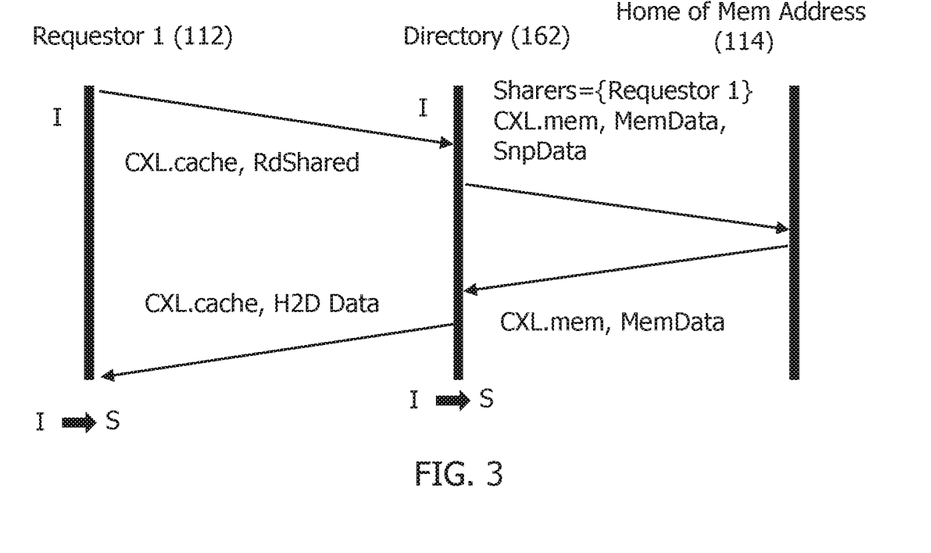
FIG. 3 is a timing diagram further illustrating the example of the operation of processing system 100 in accordance with the present invention.

FIG. 3 shows a timing diagram that further illustrates the example of the operation of processing system 100 in accordance with the present invention. FIG. 3 is illustrated with the semantics (operands-command names) described in the CXL specification. As shown in FIG. 3, a requestor 1 (e.g., specialized device 112 in the FIG. 2 example) starts in the "I" state, and outputs the CXL.cache and RdShared (read shared) commands to only home agent 160 to request the requested data.

When home agent 160 is also in the I state, home agent 160 sends the CXL.mem, MemRd (memory read), and SnpData (snoop data) commands to the home of the memory address (specialized device 114 in the FIG. 2 example) which, in turn, responds with CXL.mem and MemData (memory data).

Home agent 160 updates the status from I to S, and adds a pointer to the requestor 1 (specialized device 112 (Sharers={local device})) in coherence directory 162, and outputs CXL.cache and H2D Data to the requestor 1 (specialized device 112), which updates the MSI protocol status from I to S in last level cache 134-2.

Thus, one of the advantages of the present invention is that the present invention allows as few as one cache line to be transferred from one specialized device to another specialized device, which significantly reduces the bus traffic when compared to transferring a page of cache lines. In addition, no programming intervention is required. A programmer need only insert a read command without the need to manually track the protocol states during coding to ensure cache coherency.

Referring again to FIG. 2 and continuing with the above example, when processor 158 of third specialized device 116 outputs a request to read the memory address "X," the request first goes to lower level cache(s) 154-1, which provides the data when present and valid. When not present or invalid in lower level cache(s) 154-1, the request goes to last level cache 154-2, which provides the data when present and valid.

As shown in FIG. 2, when the MSI state of the cache line of memory address X in last level cache 154-2 is marked with an "I" to indicate that the data associated with memory address X is invalid, memory 150 forwards the request to only home agent 160. In response to all read requests, home agent 160 checks coherence directory 162 and, when the MSI state of the memory address in home agent 160 is marked with an "S" to indicate that one or more of the last level caches hold a valid copy of the data associated with memory address X, home agent 160 determines from the pointer the device that has a valid copy, e.g., first specialized device 112 has a valid copy in this example.

Following this, home agent 160 outputs a fetch command to only last level cache 134-2 of first specialized device 112, which outputs the data associated with memory address X back to home agent 160. Home agent 160 then forwards the data to third specialized device 116 to be provided to processor 158.

Figure 4:
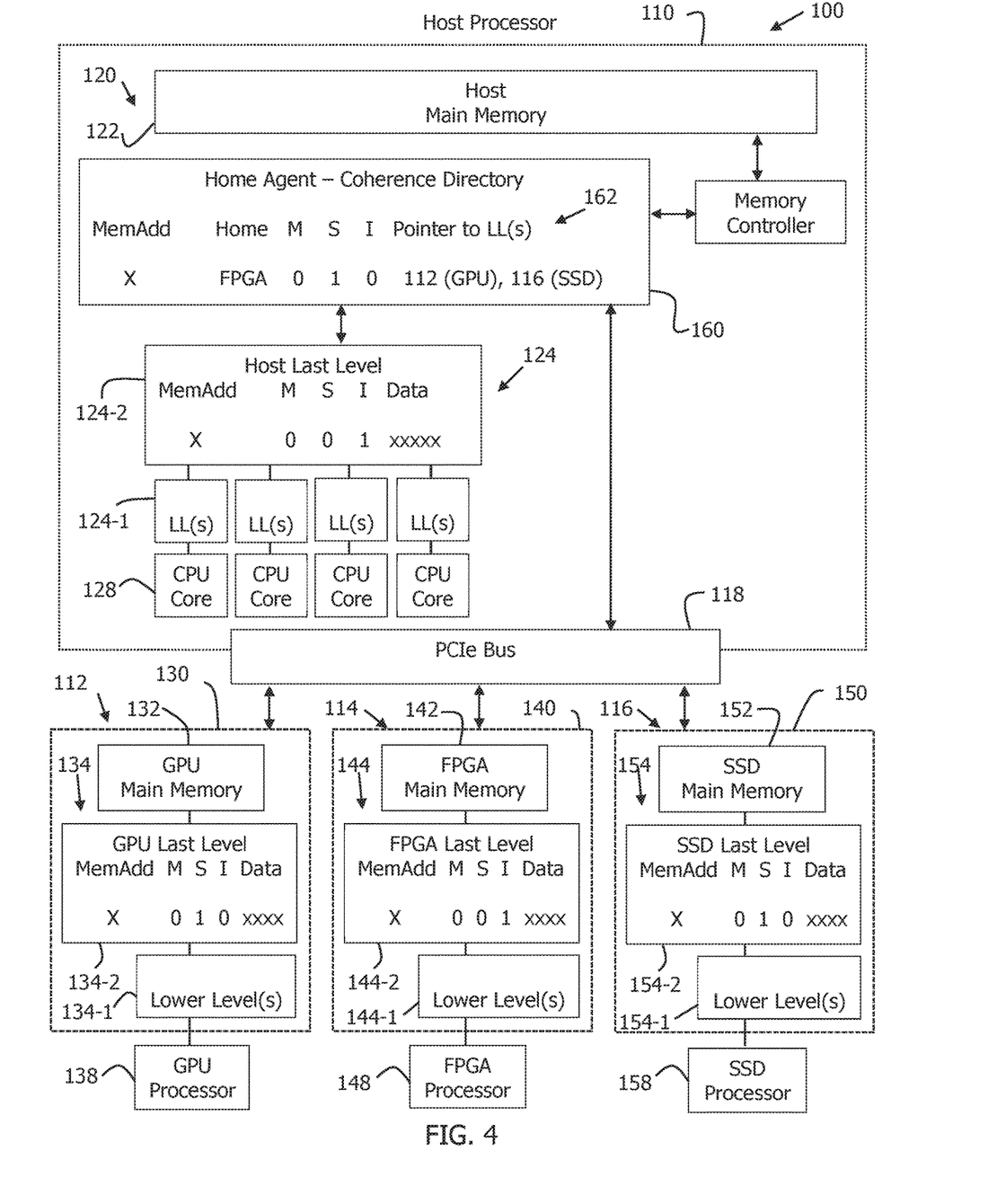
FIG. 4 is a block diagram illustrating an example of the coherence updates to processing system 100 in accordance with the present invention.

FIG. 4 shows a block diagram that illustrates an example of the coherence updates to processing system 100 in accordance with the present invention. As shown in FIG. 4, home agent 160 leaves the MSI state of memory address X at S for shared, but updates the pointer in coherence directory 162 to also point to specialized device 116. In addition, memory 150 updates the MSI state of memory address X from I for invalid to S for shared in last level cache 154-2.

Another advantage of the present invention is that it is much faster to obtain the data from a cache line of last level cache 134-2 than it is to obtain the data from main memory 142. In the present example, the last level caches 124-2, 134-2, 144-2, and 154-2 are implemented with RAM memory, while the main memories are implemented with a much slower memory type, such as a hard disk drive.

Figure 5:
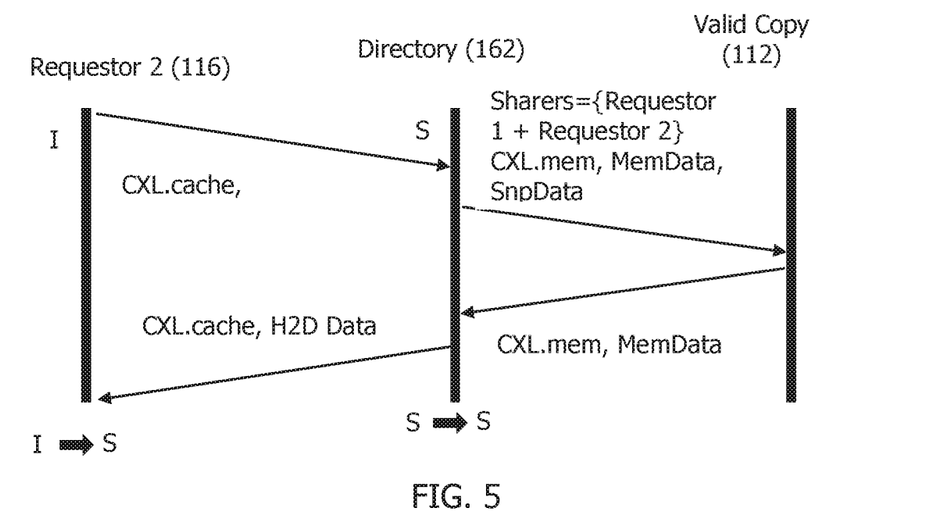
FIG. 5 is a timing diagram further illustrating the example of the operation of processing system 100 in accordance with the present invention.

FIG. 5 shows a timing diagram that further illustrates the example of the operation of processing system 100 in accordance with the present invention. FIG. 5 is also illustrated with semantics (operands-command names) described in the CXL specification. As shown in FIG. 5, a requestor 2, such as specialized device 116, starts in the "I" state and, as before, outputs the CXL.cache and RdShared (read shared) commands to coherence director 162 in home agent 160 to request the cache line data.

When home agent 160 is in the S state, home agent 160 sends the CXL.mem, MemRd (memory read), and SnpData (snoop data) commands to the device identified by the pointer as having a valid copy of the requested data (specialized device 112) which, in turn, responds with CXL.mem and MemData (memory data). Home agent 160 maintains the status of S, adds specialized device 116 to the pointer (Sharers=Sharers+{local device}), and outputs CXL.cache and H2D Data to specialized device 116, which updates the MSI status from I to S.

Referring again to FIG. 4 and continuing with the above example, when processor 138 outputs a request to write data to the cache line of memory address "X," the request is directed to last level cache 134-2, which determines whether last level cache 134-2 has permission to write the data, i.e., whether the cache line of memory address X is in the M state. When in the M state, last level cache 134-2 accepts the written data.

When the MSI state in last level cache 134-2 is marked with an S (or an I) to indicate that the data associated with memory address X is shared (or invalid), memory 150 forwards the write request to only home agent 160 by way of bus 118. In response to all write requests, home agent 160 checks coherence directory 162 and, when the MSI state of memory address X in home agent 160 is marked with an "S" to indicate that last level caches are sharing a valid copy of the data at memory address X (or an I to indicate that no cache has a valid copy), home agent 160 changes the status to "M" for modified in coherence directory 162.

When only last level cache 134-2 has a valid copy (or no last level cache has a valid copy), home agent 160 sends an authorization to last level cache 134-2, which changes the MSI protocol state to M, and then accepts the written data from processor 138. Following this, last level cache 134-2 writes the data to home agent 160 which, in turn, writes the data to the main memory of the home device (specialized device 114 in the present example).

When processor 158 (instead of processor 138) outputs a request to write data to the cache line of memory address "X," the request is directed to last level cache 154-2, which determines whether last level cache 154-2 has permission to write the data, i.e., whether the cache line of memory address X is in the M state. When in the M state, last level cache 154-2 accepts the written data.

When the MSI state in last level cache 154-2 is marked with an "S" to indicate that the data associated with memory address X is shared, memory 150 forwards the request to only home agent 160 by way of bus 118. Home agent 160 checks coherence directory 162 and, when the MSI state of memory address X in home agent 160 is marked with an "S" to indicate that last level caches are sharing a valid copy of the data at memory address X, home agent 160 changes the status to "M" for modified in coherence directory 162, and deletes specialized device 112 from the pointer.

In addition, home agent 160 sends an invalidate message to specialized device 112 (the shared devices), which changes the MSI protocol state to "I" for invalid in last level cache 134-2. Further, home agent 160 sends an authorization to last level cache 154-2, which changes the MSI protocol state to M, and then accepts the written data from processor 158.

Figure 6:
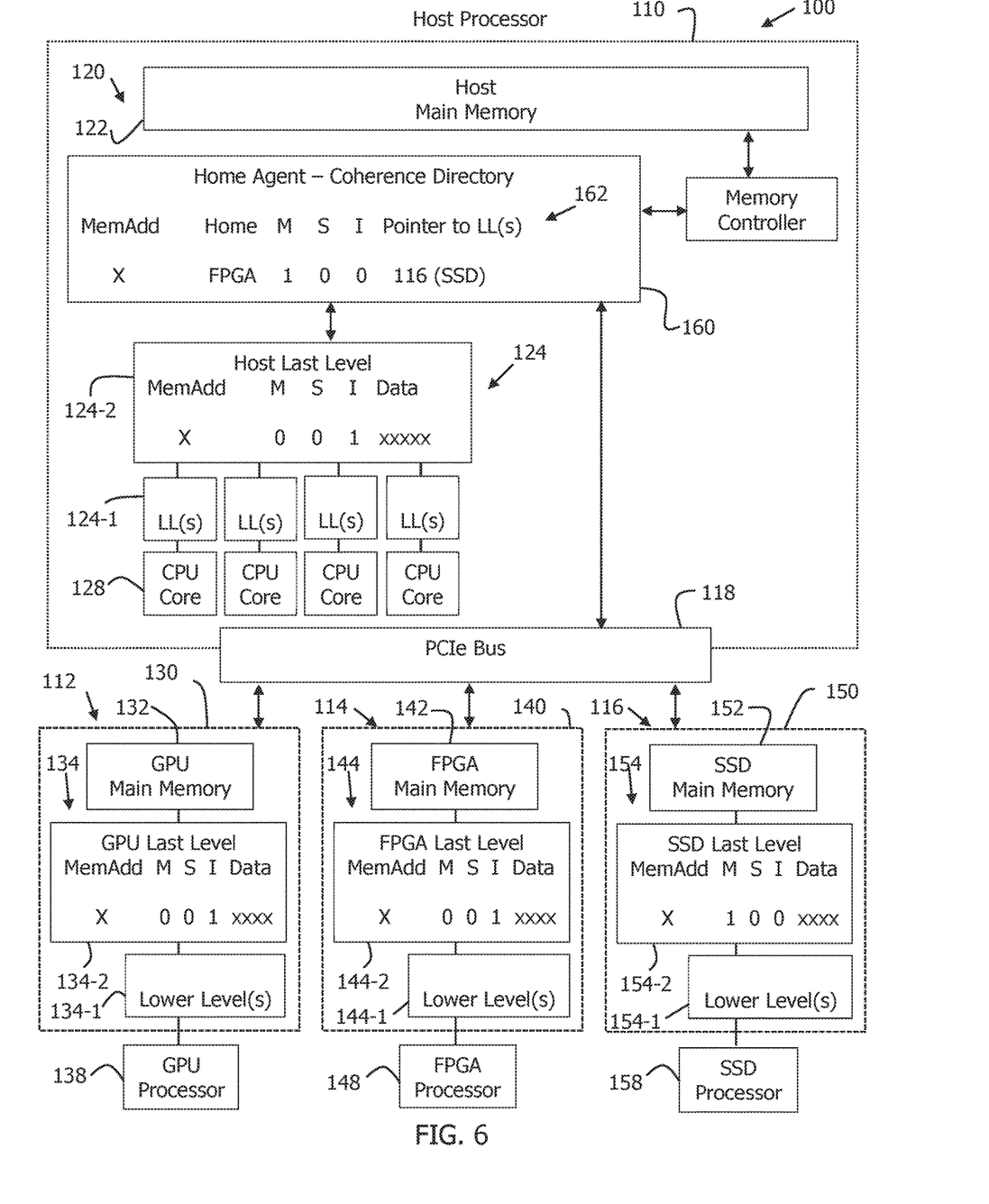
FIG. 6 is a block diagram illustrating an example of the updates to processing system 100 in accordance with the present invention.

FIG. 6 shows a block diagram that illustrates an example of the updates to processing system 100 in accordance with the present invention. As shown in FIG. 6, home agent 160 changes the MSI state of memory address X in coherence directory 162 from S for shared to M for modified, and updates the pointer to remove specialized device 112. In addition, memory 130 updates the MSI state of memory address X to I for invalid in last level cache 134-2. Home agent 160 also sends an approval message to specialized device 116, which writes the data to last level cache 154-2 and updates the MSI protocol status from S for shared to M for modified in last level cache 154-2. Following this, last level cache 154-2 writes the data to home agent 160 which, in turn, writes the data to the main memory of the home device (main memory 142 of specialized device 114 in the present example).

Figure 7:
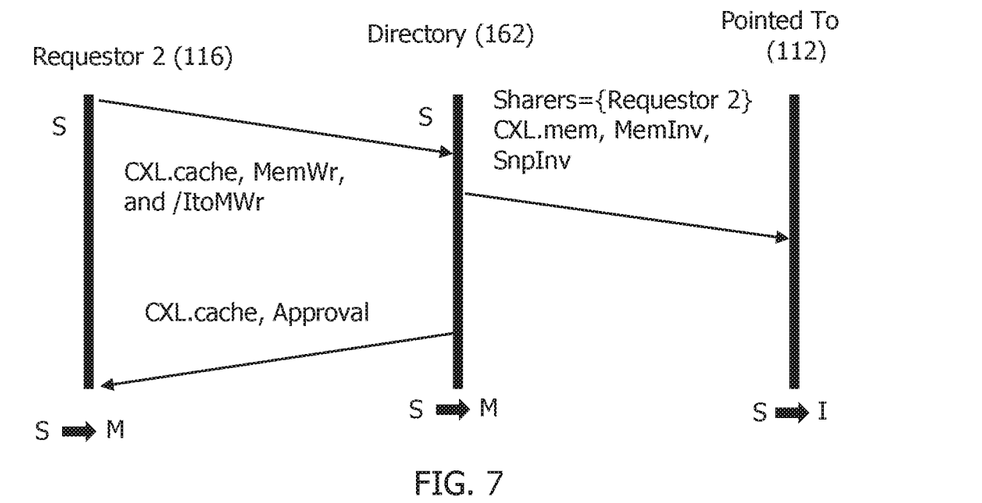
FIG. 7 is a timing diagram further illustrating the example of the operation of processing system 100 in accordance with the present invention.

FIG. 7 shows a timing diagram that further illustrates the example of the operation of processing system 100 in accordance with the present invention. FIG. 7 is also illustrated with semantics (operands-command names) described in the CXL specification. As shown in FIG. 7, specialized device 116 starts in the "S" protocol state and outputs the CXL.cache, MemWr (memory write), and /ItoMWr commands to home agent 160 to request permission to write new data into the cache line of memory address X.

When home agent 160 is in the S protocol state, home agent 160 sends the CXL.mem, MemInv (memory invalidate), and SnpInv (snoop invalidate) commands to the shared device(s) in the pointer (specialized device 112) which, in turn, responds by changing the MSI protocol state from S for shared to I for invalid in last level cache 134-2.

Home agent 160 also updates the MSI protocol state in coherency directory 162 from S for shared to M for modified. In addition, home agent 160 sends an approval message to specialized device 116, which writes the data to last level cache 154-2 and updates the MSI protocol status from S for shared to M for modified in last level cache 154-2.

Referring again to FIG. 6 and continuing with the above example, when a CPU core 128 outputs a request to read data associated with the memory address "X," the request first goes to the associated lower level cache(s) 124-1, which provides the data when present and valid. When not present or invalid in lower level cache(s) 124-1, the request goes to last level cache 124-2, which provides the data when present and valid.

When the MSI state in last level cache 124-2 is marked with an "I" to indicate that the data associated with memory address X is invalid or not present, memory 120 forwards the request to only home agent 160. Home agent 160 checks coherence directory 162 and, when the MSI state of the memory address in home agent 160 is marked with an "M" to indicate that only one last level cache holds a valid copy of the data associated with memory address X, home agent 160 determines that specialized device 116 has the valid copy from the pointer.

Following this, home agent 160 outputs a fetch command to only last level cache 154-2 of third specialized device 116, which outputs the data associated with memory address X back to home agent 160. Following this, home agent 160 receives and then forwards the requested data to memory 120 to be provided to the CPU core 128.

Figure 8:
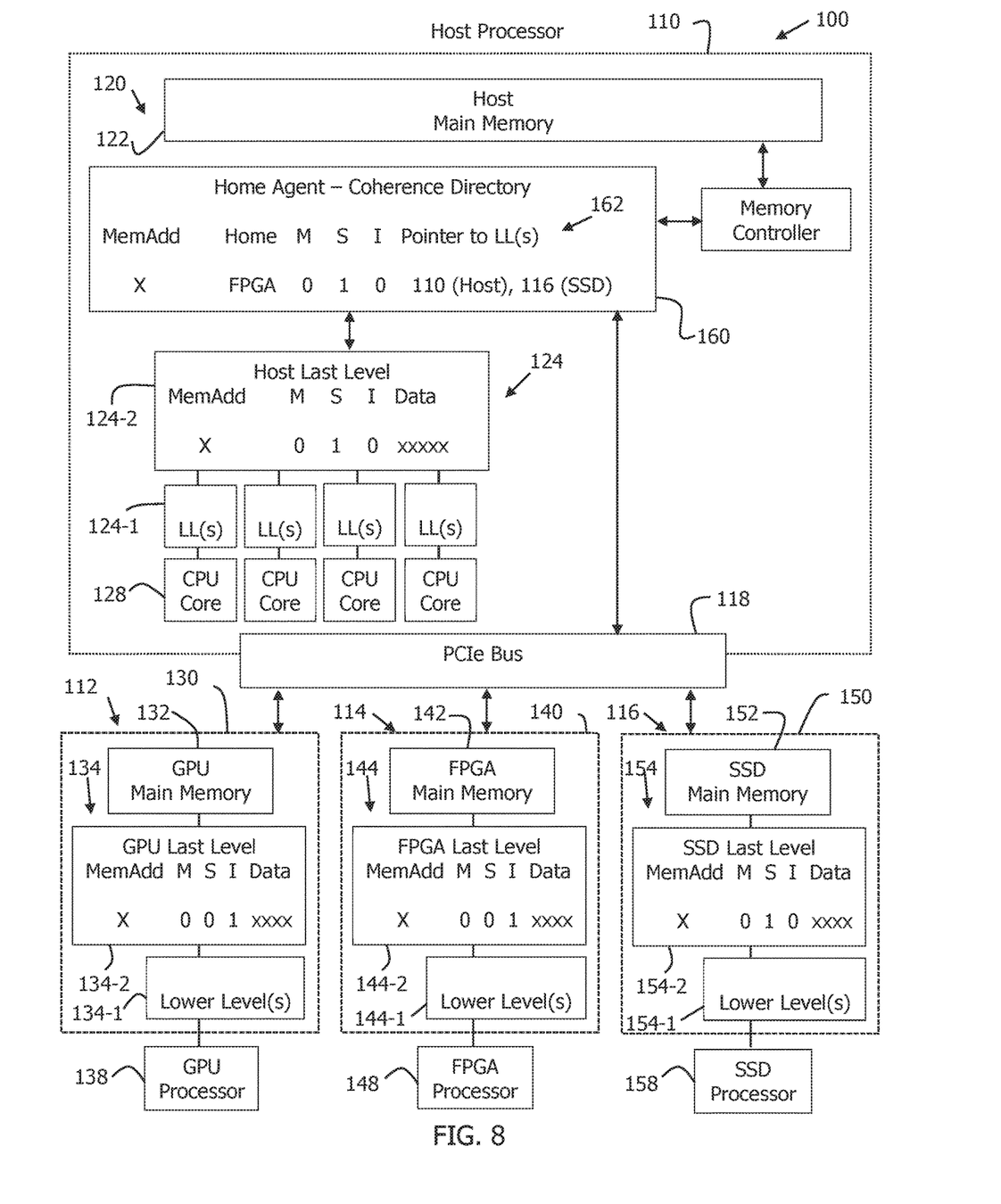
FIG. 8 is a block diagram illustrating an example of the updates to processing system 100 in accordance with the present invention.

FIG. 8 shows a block diagram that illustrates an example of the updates to processing system 100 in accordance with the present invention. As shown in FIG. 8, home agent 160 updates the MSI state of memory address X from M for modified to S for shared in coherence directory 162, and updates the pointer to also point to host processor 110. In addition, specialized device 116 updates the MSI state of memory address X from M for modified to S for shared in last level cache 154-2, and host processor 110 updates the MSI state from I for invalid to S for shared in last level cache 124-2.

Figure 9:
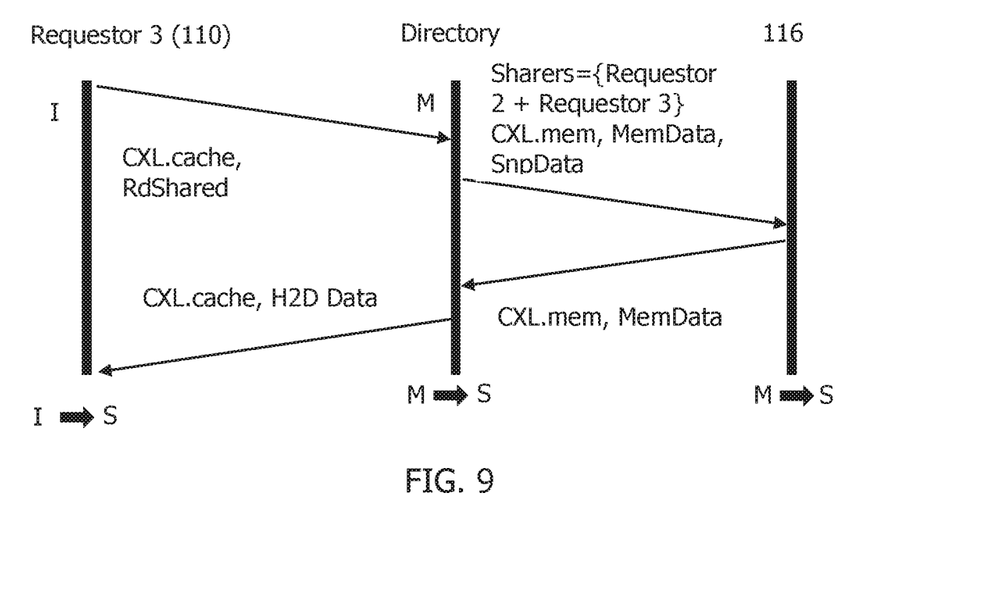
FIG. 9 is a timing diagram further illustrating the example of the operation of processing system 100 in accordance with the present invention.

FIG. 9 shows a timing diagram that further illustrates the example of the operation of processing system 100 in accordance with the present invention. FIG. 9 is also illustrated with semantics (operands-command names) described in the CXL specification. As shown in FIG. 9, last level cache 124-2 starts in the "I" state and, as before, outputs the CXL.cache and RdShared (read shared) commands to home agent 160 to request the cache line data.

When the memory address in coherent director 162 of home agent 160 is in the M state, home agent 160 sends the CXL.mem and SnpData (snoop data) commands to the device(s) identified by the pointer (specialized device 116) which, in turn, responds with CXL.cache and D2H Data. Home agent 160 changes the protocol status from M to S, adds host device 110 to the pointer (Sharers=Sharers+{local device}), and outputs CXL.cache and H2D Data to last level cache 124-2, which updates the MSI status from I to S. Specialized device 116 also changes the MSI status from M to S.

Figure 10:
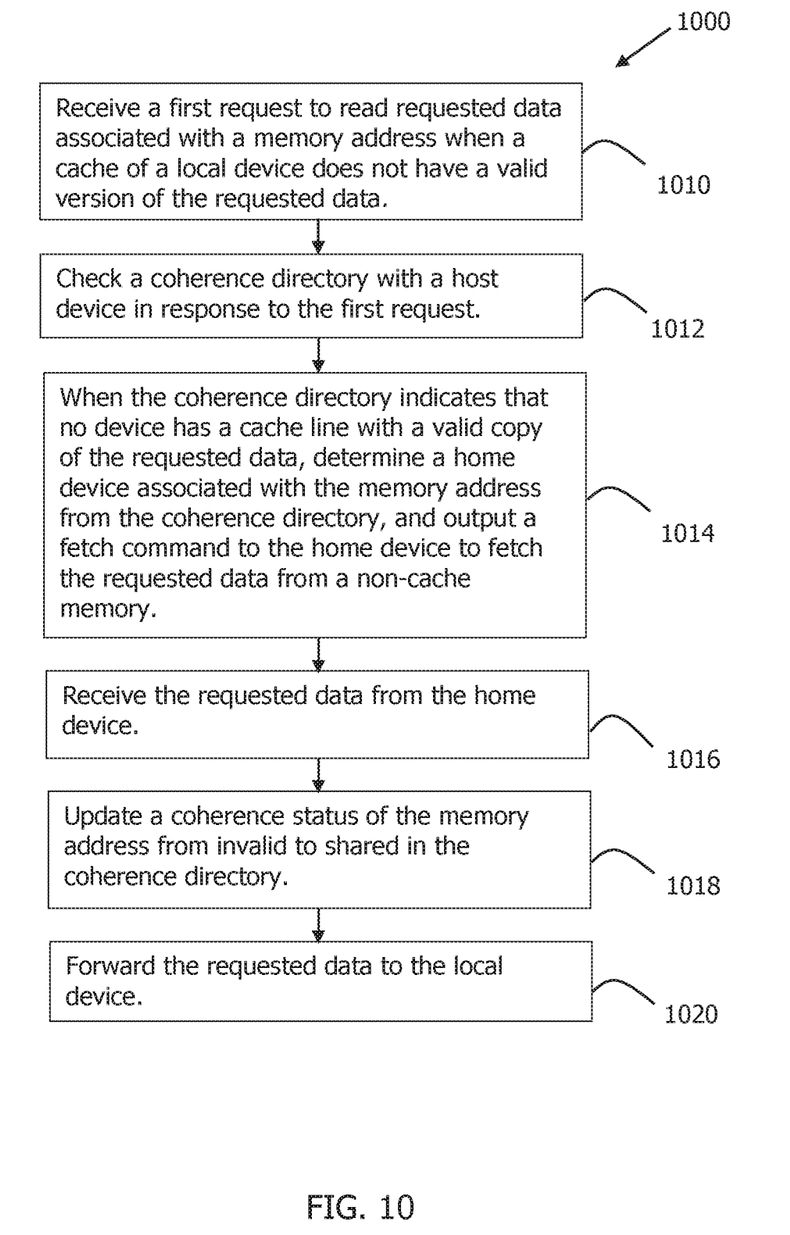
FIG. 10 is a flow chart illustrating an example of a method 1000 of operating an inter-device processing system in accordance with the present invention.

FIG. 10 shows a flow chart that illustrates an example of a method 1000 of operating an inter-device processing system in accordance with the present invention. As shown in FIG. 10, method 1000 begins at 1010 by receiving a first request to read requested data associated with a memory address when a cache of a local device (e.g., 112) does not have a valid version of the requested data. Method 1000 next moves to 1012 to check a coherence directory with a host device (e.g., 110) in response to the first request and, when the coherence directory indicates that no device has a cache line with a valid copy of the requested data, method 1000 moves to 1014 to determine a home device (e.g., 114) associated with the memory address from the coherence directory, and output a fetch command to the home device to fetch the requested data from a non-cache memory. The first request is addressed to only the host device. The fetch command is addressed to only the home device.

After this, method 1000 moves to 1016 to receive the requested data from the home device. Next, method 1000 moves to 1018 to update a coherence status of the memory address from invalid to shared in the coherence directory, and then to 1020 to forward the requested data to the local device.

Reference has now been made in detail to the various embodiments of the present disclosure, examples of which are illustrated in the accompanying drawings. Additional examples of the movement of data between host processor 110 and the specialized devices 112, 114, and 116 and the coherence process can be readily understood from the provided examples.

While described in conjunction with the various embodiments, it will be understood that these various embodiments are not intended to limit the present disclosure. On the contrary, the present disclosure is intended to cover alternatives, modifications and equivalents, which may be included within the scope of the present disclosure as construed according to the claims.

Furthermore, in the preceding detailed description of various embodiments of the present disclosure, numerous specific details are set forth in order to provide a thorough understanding of the present disclosure. However, it will be recognized by one of ordinary skill in the art that the present disclosure may be practiced without these specific details or with equivalents thereof. In other instances, well-known methods, procedures, components, and circuits have not been described in detail so as not to unnecessarily obscure aspects of various embodiments of the present disclosure.

It is noted that although a method may be depicted herein as a sequence for clarity, the sequence does not necessarily dictate the order of the operations. It should be understood that some of the operations may be skipped, performed in parallel, or performed without the requirement of maintaining a strict order of sequence.

The drawings showing various embodiments in accordance with the present disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the various embodiments in accordance with the present disclosure can be operated in any orientation.

Some portions of the detailed descriptions are presented in terms of procedures, logic blocks, processing, and other symbolic representations of operations on data bits within a computer memory. These descriptions and representations are used by those skilled in the data processing arts to effectively convey the substance of their work to others skilled in the art.

In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "determining," "assigning," "aggregating," "utilizing," "virtualizing," "processing," "accessing," "executing," "storing," or the like, refer to the action and processes of a computer system, or similar electronic computing device or processor.

The computing system, or similar electronic computing device or processor manipulates and transforms data represented as physical (electronic) quantities within the computer system memories, registers, other such information storage, and/or other computer readable media into other data similarly represented as physical quantities within the computer system memories or registers or other such information storage, transmission or display devices.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the operations and methods of the present embodiment can be implemented in logic or with software and a processing unit. If implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random-access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above description of the disclosed embodiments enables a person skilled in the art to make or use the present application. Various modifications to these embodiments are obvious to a person skilled in the art, and the general principles defined herein may be implemented in other embodiments without departing from the spirit or scope of the present application. Therefore, the present application is not limited to the embodiments shown herein, but the broadest scope consistent with the principles and novel features disclosed herein.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A processing system comprising:
   a first device having a first cache, the first device to output a first request to read requested data associated with a memory address when the first cache of the first device does not have a valid version of the requested data;
   a second device coupled to the first device, the second device having a coherence directory, the second device to check the coherence directory in response to the first request and, when the coherence directory indicates that no device has a cache line with a valid copy of the requested data, output a first fetch command to fetch data, the first request being output by the first device to only the second device; and
   a third device coupled to the first and second devices, the third device having a third cache and a non-cache memory, the third device to output the requested data to only the second device from the non-cache memory in response to the first fetch command,
   wherein the second device to forward the requested data to the first device, and update a coherence status of the memory address in the coherence directory from invalid to shared to indicate that the first device shares a copy of the requested data.

2. The processing system of claim 1, wherein the first device updates a coherence status from invalid to shared to indicate that the first device shares a valid copy of the requested data.

3. The processing system of claim 1, further comprising a fourth device having a fourth cache, the fourth device to output a second request to only the second device to read the requested data associated with the memory address when the fourth cache of the fourth device does not have a valid version of the requested data.

4. The processing system of claim 3, wherein the second device to check the coherence directory in response to the second request and, when the coherence directory indicates that the first cache of the first device has a cache line with a valid copy of the requested data, output a second fetch command to the first device to fetch the requested data.

5. The processing system of claim 4, wherein:
   the first device to output the requested data to the second device in response to the second fetch command; and
   the second device to forward the requested data to the fourth device,
   wherein the fourth device to change a coherency status from invalid to shared after receiving the requested data.

6. The processing system of claim 5, wherein:
   the fourth device to output a third request to only the second device to write new data to a cache line in the fourth cache that has the memory address; and
   the second device to check the coherence directory in response to the third request and, when the coherence directory indicates that only the first device has a cache with a valid copy of the requested data, update a coherence status of the memory address in the coherence directory from shared to modified to indicate that the fourth device to modify the requested data.

7. The processing system of claim 6, wherein the second device to output an invalidate message to the first device when the fourth device is to modify the requested data.

8. The processing system of claim 1 wherein the first device is one of a graphical processor unit, a field programmable gate array, and a solid state device, and the second device is a host processor.

9. The processing system of claim 1, wherein:
the first device to output a second request to only the second device to write new data to a cache line in the first cache that has the memory address; and
the second device to check the coherence directory in response to the second request and, when the coherence directory indicates that only the first device has a cache line with a valid copy of the requested data, update a coherence status of the memory address in the coherence directory from shared to modified to indicate that the first device to modify the requested data.

10. The processing system of claim 1, wherein the first and third devices are coupled together by a PCIe bus.

11. A method of operating an inter-device processing system, the method comprising:
receiving a first request to read requested data associated with a memory address when a cache of a local device does not have a valid version of the requested data;
checking a coherence directory with a host device in response to the first request and, when the coherence directory indicates that no device has a cache line with a valid copy of the requested data:
determining a home device associated with the memory address from the coherence directory, and
outputting a fetch command to the home device to fetch the requested data from a non-cache memory, the first request being addressed to only the host device, the fetch command being addressed to only the home device;
receiving the requested data from the home device;
updating a coherence status of the memory address from invalid to shared in the coherence directory; and
forwarding the requested data to the local device.

12. The method of claim 11, wherein the local device updates a coherence status from invalid to shared to indicate that the local device shares a valid copy of the requested data.

13. The method of claim 11, further comprising receiving a second request from a remote device to read the requested data associated with the memory address when a cache of the remote device does not have a valid version of the requested data.

14. The method of claim 13, further comprising checking the coherence directory in response to the second request and, when the coherence directory indicates that the cache of the local device has a cache line with a valid copy of the requested data, outputting a second fetch command to the local device to fetch the requested data.

15. The method of claim 14, wherein:
the local device to output the requested data to the host device in response to the second fetch command;
the host device to forward the requested data to the remote device; and
the remote device to change a coherency status from invalid to shared after receiving the requested data.

16. The method of claim 15, further comprising:
receiving a third request from the remote device to write new data to a cache line in the cache of the remote device that has the memory address; and
checking the coherence directory in response to the third request and, when the coherence directory indicates that only the first device has a cache with a valid copy of the requested data, updating a coherence status of the memory address in the coherence directory from shared to modified to indicate that the remote device to modify the requested data.

17. The method of claim 16, further comprising outputting an invalidate message to the local device when the remote device is to modify the requested data.

18. The method of claim 11 wherein the local device is one of a graphical processor unit, a field programmable gate array, and a solid state device.

19. The method of claim 11, further comprising:
receiving a second request from the local device to write new data to a cache line in the cache of the local device that has the memory address; and
checking the coherence directory in response to the second request and, when the coherence directory indicates that only the local device has a cache line with a valid copy of the requested data, updating a coherence status of the memory address in the coherence directory from shared to modified to indicate that the local device to modify the requested data.

20. A non-transitory computer-readable storage medium having embedded therein program instructions, which when executed by one or more processors of a device, causes the device to execute a method that operates an inter-device processing system, the method comprising:
receiving a first request to read requested data associated with a memory address when a cache of a local device does not have a valid version of the requested data;
checking a coherence directory with a host device in response to the first request and, when the coherence directory indicates that no device has a cache line with a valid copy of the requested data:
determining a home device associated with the memory address from the coherence directory, and
outputting a fetch command to the home device to fetch the requested data from a non-cache memory, the first request addressed to only the host device, the fetch command being addressed to only the home device;
receiving the requested data from the home device;
updating a coherence status of the memory address from invalid to shared in the coherence directory; and
forwarding the requested data to the local device.

* * * * *